(12) United States Patent
Frigge et al.

(10) Patent No.: US 10,839,987 B2
(45) Date of Patent: Nov. 17, 2020

(54) HIGH TEMPERATURE RESISTANT COLORED, ESPECIALLY ORANGE COLORED ADHESIVE TAPE AS WELL AS METHOD AND CARRIERS FOR THE MANUFACTURE THEREOF AND WIRING HARNESS WITH SUCH AN ADHESIVE TAPE

(71) Applicant: Coroplast Fritz Müller GmbH & Co. KG, Wuppertal (DE)

(72) Inventors: Christoph Frigge, Sporckhövel (DE); Gülay Wittig, Bochum (DE)

(73) Assignee: Coroplast Fritz Müller GmbH & Co. KG, Wuppertal (DE)

( * ) Notice: Subject to any disclaimer, the term of this patent is extended or adjusted under 35 U.S.C. 154(b) by 479 days.

(21) Appl. No.: 15/364,840

(22) Filed: Nov. 30, 2016

(65) Prior Publication Data

US 2017/0169916 A1    Jun. 15, 2017

(30) Foreign Application Priority Data

Dec. 10, 2015   (DE) .......................... 10 2015 121 562

(51) Int. Cl.
*D01F 1/04* (2006.01)
*H01B 7/17* (2006.01)
(Continued)

(52) U.S. Cl.
CPC .............. *H01B 7/366* (2013.01); *C09B 31/02* (2013.01); *C09B 62/25* (2013.01); *C09J 7/205* (2018.01); *C09J 7/21* (2018.01); *C09J 7/38* (2018.01); *C09J 11/06* (2013.01); *C09J 133/02* (2013.01); *D01D 1/065* (2013.01); *D01D 5/08* (2013.01); *D01F 1/04* (2013.01); *D06P 1/38* (2013.01); *H01B 3/421* (2013.01); *H01B 3/441* (2013.01);
(Continued)

(58) Field of Classification Search
None
See application file for complete search history.

(56) References Cited

U.S. PATENT DOCUMENTS

| 8,143,524 | B2 * | 3/2012 | Wittig | ........................ | C09J 7/21 174/117 A |
| 2011/0027548 | A1 * | 2/2011 | Nusser | ...................... | D06P 1/18 428/201 |
| 2014/0065377 | A1 * | 3/2014 | Horvath | ................... | D03D 1/00 428/193 |

FOREIGN PATENT DOCUMENTS

| CN | 1173520 A | 2/1998 |
| CN | 1842560 A | 10/2006 |

(Continued)

OTHER PUBLICATIONS

German Examination Report—dated Sep. 23, 2016.

*Primary Examiner* — Frank D Ducheneaux
(74) *Attorney, Agent, or Firm* — Dickinson Wright PLLC

(57) ABSTRACT

An orange-colored adhesive tape (1) a cable-wrapping tape, including a colored textile substrate (4, 4a, 4b) and an adhesive layer (5, 5a, 5b) applied at least to one side of the substrate (4, 4a, 4b). The substrate (4, 4a, 4b) contains at least one red and at least one further colorant. In order to improve colored tapes of the above-mentioned type, in particular providing increased temperature stability, while maintaining advantageous usage properties, at least one of the colorants contains a disazo compound or is completely formed therefrom. A method and a substrate (4, 4a, 4b) for manufacturing the adhesive tape (1) as well as a cable harness (3) with the adhesive tape (1) are also described.

38 Claims, 5 Drawing Sheets

(51) Int. Cl.
  *H01B 7/00*    (2006.01)
  *H01B 13/012*  (2006.01)
  *D06P 1/38*    (2006.01)
  *D01D 1/06*    (2006.01)
  *D01D 5/08*    (2006.01)
  *H01B 3/42*    (2006.01)
  *H01B 7/29*    (2006.01)
  *C09B 31/02*   (2006.01)
  *C09B 62/25*   (2006.01)
  *C09J 7/38*    (2018.01)
  *C09J 7/21*    (2018.01)
  *C09J 11/06*   (2006.01)
  *C09J 133/02*  (2006.01)
  *H01B 7/36*    (2006.01)
  *H01B 7/18*    (2006.01)
  *C09J 7/20*    (2018.01)
  *H01B 3/44*    (2006.01)

(52) U.S. Cl.
  CPC ............ *H01B 7/0045* (2013.01); *H01B 7/17* (2013.01); *H01B 7/1855* (2013.01); *H01B 7/292* (2013.01); *H01B 13/012* (2013.01); *C09J 2203/302* (2013.01); *C09J 2301/122* (2020.08); *C09J 2301/302* (2020.08); *C09J 2301/416* (2020.08); *C09J 2400/263* (2013.01); *C09J 2407/00* (2013.01); *C09J 2423/106* (2013.01); *C09J 2433/00* (2013.01); *C09J 2467/006* (2013.01); *C09J 2477/006* (2013.01); *C09J 2483/00* (2013.01); *D10B 2331/04* (2013.01)

(56)  References Cited

FOREIGN PATENT DOCUMENTS

| | | |
|---|---|---|
| CN | 101412895 A | 4/2009 |
| CN | 101652431 A | 2/2010 |
| DE | 196 23 411 A1 | 12/1997 |
| DE | 10 2004 028 825 A1 | 1/2006 |
| DE | 10 2011 079 114 A1 | 1/2013 |
| DE | 10 2013 108 917 A1 | 4/2014 |
| DE | 20 2013 102 969 U1 | 11/2014 |
| EP | 1 315 781 B1 | 1/2005 |
| EP | 2 546 317 A1 | 1/2013 |

* cited by examiner

HIGH TEMPERATURE RESISTANT COLORED, ESPECIALLY ORANGE COLORED ADHESIVE TAPE AS WELL AS METHOD AND CARRIERS FOR THE MANUFACTURE THEREOF AND WIRING HARNESS WITH SUCH AN ADHESIVE TAPE

CROSS REFERENCE TO RELATED APPLICATIONS

This application claims priority to German Patent Application No. 10 2015 121 562.4, filed Dec. 10, 2015.

FIELD OF THE INVENTION

The invention relates to an adhesive tape, in particular an orange-colored adhesive tape, preferably a cable winding tape, composed of a colored textile substrate and an adhesive layer applied at least to one side of t the substrate, wherein the substrate contains at least one red and optionally at least one further colorant. Furthermore, the invention relates to a method and a substrate for manufacturing the adhesive tape as well as a cable harness including such an adhesive tape.

BACKGROUND

For bundling and for protection from lines, e.g., in the automotive field, the latter are often provided with protective covers. For this purpose hoses, tubes, and advantageously cable winding tapes are used.

Adhesive tapes, including those of the type mentioned, must fulfill uniform standards, in particular the standard LV 312 (October 2009) with respect to their usage properties. This standard classifies adhesive tapes with respect to their properties for applications in the automotive industry, preferably for bundling and wrapping of lines and line sets. The named standard was developed by the representatives of the automobile manufacturers AUDI AG, BMW AG, Daimler AG, Porsche AG, and Volkswagen AG.

When this standard LV 312 or other standards to which reference is made, for example, in LV 312, such as, for example, EN 1942, EN 14410, EN 1939, are mentioned below, the versions in effect at the time of the application are always meant.

The usage properties of adhesive tapes include, for example, the adhesive force on the tape backs and the unrolling force as well as the hand tearability. Further usage properties are the adhesive force on certain materials, the thickness, the elongation at break, the breaking force, the tear resistance, the flagging, as well as the abrasion resistance and the temperature resistance.

High-voltage lines and in particular also the adhesive tapes used for covering these lines in signal colors, e.g., yellow or orange, are embodied in particular for use in electric vehicles. In addition, in particular, for example for 48V wiring systems, violet electrical lines and adhesive tapes can be provided.

For safety reasons it is necessary that these colors still be recognizable even after high temperature loads. Some color change is definitely accepted here, but not discoloration or browning.

An adhesive tape of the above-described type is described in EP 2 546 317 B1. This is comprised of a textile substrate and of an adhesive layer applied to at least one side of the substrate, wherein the substrate is colored by a mixture of colorants and/or pigments. The mixture is comprised of yellow and red colorants and/or pigments, wherein the yellow colorant and/or the yellow pigment is based on anthraquinone, and the red colorant and/or the red pigment on an azo compound or comprises a mixture of anthraquinone compounds and azo compounds.

In EP 2 546 317 B1 the problem addressed is to realize adhesive tapes with signal colors using the substrate materials known to be used even with high temperature classes. Here it is emphasized that with "standard orange pigments with azo bases," whose use for orange coloring of a textile adhesive-tape substrate appeared to be the most obvious technical solution, only a low temperature class could be achieved, both with piece coloring and with spinning jet coloring.

However, according to the above referenced patent, a higher temperature stability was then achieved by a mixture of an azo- and anthraquinone-pigment. However, here a spinning jet coloring; for example practiced according to EP 1 607 459 B1 for carbon black as colorant; was decidedly advised against since color pigments/colorants introduced in a substrate in this way display degeneration phenomena, thus discoloration.

Instead, the coloring of the fibers, filaments, or yarns of the textile substrate was according to EP 2 546 317 B1 by means of disperse dyeing. With disperse dyeing synthetic colorants that are poorly soluble or practically insoluble in water are used. However, since the colorant also comes from an aqueous medium, the colorant is finely powdered and added to a dye bath heated to approximately 100° C. The dye particles finely distributed therein rise out of the mixture and then diffuse into the fibers where they dissolve and should enter a fixed bond.

With the continuously (e.g. in the thermosol process with integrated foulard) or discontinuously (so-called beam dyeing or using a "high-pressure jigger") running-disperse dyeing, white fabric is impinged with a colorant in an impregnating bath. Here dispersing agents are used as an additive in order to obtain a uniform distribution of the colorant in the dispersion. With this dyeing method the colorant initially surrounds the fiber in order to then penetrate it under the influence of heat and/or pressure.

In preparation for the coloring process, to facilitate penetration, degumming or removal of oils and/or prefixing of the fabric can occur. In continuous coloring in the thermosol process a thermal fixing process of the dye is set up downstream.

Disadvantageously anthraquinone, whose base is to be used in the colorants according to EP 2 546 317 B1, is classified as a harmful substance. The substance is a potential carcinogen; meaning that it is suspected of causing cancer.

SUMMARY AND INTRODUCTORY DESCRIPTION OF THE INVENTION

The object of the present invention is to improve orange-colored adhesive tapes of the above-mentioned type while maintaining advantageous use properties, such as, for example, high abrasion resistance. In particular an adhesive tape should be made available here with improved temperature stability. If possible, here the use of substances of problematic health impact, such as anthraquinone, should also be avoidable.

This object is inventively achieved in that at least one of the colorants contains a disazo compound or is formed completely thereof.

The disazo compound can in particular be a red colorant.

Disazo compounds represent a specific form of the azo colorants, in particular the azo pigments that are practically insoluble in an application medium. These are organic pigments that contain one or more, in the inventive case two, azo groups —N═N— as chromophore. Such disazo pigments are available in trade as strongly coloring, advantageously non-toxic, practically insoluble powder and, among other places, are used in the construction industry, in the field of dyes and paints, in the paper industry, for printing inks and in glass manufacturing.

Using suitable mixtures of red and yellow colorants, all RAL orange tones can be inventively used here as needed: RAL 2000 yellow-orange, RAL 2001 red-orange, RAL 2002 blood-orange, RAL 2003 pastel-orange, RAL 2004 pure orange, RAL 2005 light orange, RAL 2007 light-bright-orange, RAL 2008 bright-red-orange, RAL 2009 traffic orange, RAL 2010 signal orange, RAL 2011 deep orange, RAL 2012 salmon orange, RAL 2013 pearl orange.

For this purpose at least one further colorant can be a yellow colorant that preferably contains a mono or disazo compound or is completely formed therefrom.

Using suitable mixtures of red and blue colorants, all RAL violet tones can be inventively configured here as needed: e.g., RAL 4001 red lilac, RAL 4002 red violet, RAL 4003 Heather violet, RAL 4004 Bordeaux violet, RAL 4005 blue lilac, RAL 4006 traffic purple, RAL 4007 purple violet, RAL 4008 signal violet, RAL 4009 pastel violet, RAL 4010 tele magenta.

For this purpose at least one further colorant can be a blue colorant. As such, for example, colorants from the group of phthalocyanines, in particular as pigments, can be used. These are highly thermally stable and also compatible in the mixture with red disazo colorants. Thus the fibers of the substrate can contain, for example, copper phthalocyanine in mixture with a red disazo colorant.

Colors that are referred to here as RAL colors are standardized according to a color catalog. The name RAL comes from Reichs-Ausschuss für Lieferbedingungen (English: Imperial Commission for Delivery Terms and Quality Assurance), which was founded in Berlin in 1925 and served to streamline the German economy. Each color of the color catalog is assigned a four-digit color number. The goal of color standardization is to allow customers and suppliers to mutually communicate without having to exchange color samples, but only a RAL number. The RAL colors can also be seen on the internet at https://de.wikipedia.org/wiki/RAL-Farbe (English page: https://en.wikipedia.org/wiki/RAL_colour_standard).

Preferably according to the invention, a color RAL 2003 pastel orange or even non-standardized intermediate colors can preferably be obtained in the substrate of the adhesive tape. Likewise according to the invention it is possible in a simple manner to use specified colors within the RAL 1000 series (yellow), the RAL 3000 series (red), RAL 4000 series, as well as the RAL 8000 series (brown) in the adhesive tape substrate.

Another possibility is to identify the colors by the so-called "Pantone Matching System (PMS)." PMS, like the RAL system, is also the name of a internationally popular color system that is primarily used in the graphics and printing industry. It was developed in 1963 by Pantone LLC, a US-American company with headquarters in Carlstadt, N.J. The Pantone Matching System is based on 14 basic colors that when mixed with each other in different color proportions produce all other colors represented in the system. The colors are printed on at least three different types of paper, namely coated, uncoated, and matte, in order to represent the color impression of a Pantone colors, also defined by a number code, depending on the printed medium. Thus the respective color impression can vary significantly in part depending on the surface quality of a paper. For this reason Pantone colors are defined by the number code and, when they are printed on paper, also with the corresponding initial for the type of paper used (C=coated, U=uncoated, M=matte). The color RAL 2003 preferred in the context of the invention corresponds in PMS to the color 1575. Furthermore, there are custom and basic colors in the Pantone Matching System that have no numerical designation, but rather are given names. Among other things Pantone colors are used this way to define colors of flags, for example, in the European flag the blue by the color "Pantone Reflex Blue" and the yellow of the twelve stars by the color "Pantone Yellow."

With regard to the distinction between colorants and pigments reference is made to DIN 55943:2001-10 and also DIN ISO 18451-1:2014-07 (unchanged in this regard), according to which all chromophoric substances are referred to as colorants. These are then divided into soluble colorants and insoluble pigments. However, the solubility can be very different depending on the use and solvent, with the result that the same substance can be a colorant in one instance and a pigment in another. This understanding is taken as a basis for the application. The difference between azo pigments and azo colorants is that as a rule azo pigments, due to their insolubility, cannot be absorbed by the body or broken down by its metabolism. They are therefore non-toxic.

On the one hand insolubility can be advantageously achieved here by first synthesizing soluble azo colorants, which can contain, for example, carboxylic-acid- and/or sulfuric-acid-substitutes, and these are then transformed to insoluble salts with metal salts, such as, for example, calcium-, strontium-, barium-, or magnesium-salts. According to the invention this treatment, also called sealing, can be used both for the diazo disazo colorant and for a monoazo colorant having only one azo group, which is preferably mixed with the inventively used disazo colorant.

On the other hand, in the context of the invention insolubility can also be achieved at the outset in the manufacture of the colorant by avoiding substituents in the molecule, for example sulfonic acid groups, which increase the solubility, and instead use substituents that reduce solubility, such as carbonic acid amide groups.

Surprisingly and contrary to the teaching described in EP 2 546 317 B1 it is also inventively possible to manufacture a color-stable orange fabric using spinning-jet coloring.

In order for the spinning-jet coloring, sometimes also called 'in situ' coloring, to generate a textile pulp, first a polymer provided for the manufacture of fiber is melted. The colorant, preferably as pigment, optionally together with additives such as antioxidants, is added to the molten polymer. Thus the textile pulp, which is used for the manufacture of fibers, is directly colored in a relatively less complex and technologically environmentally friendly manner. Subsequently the pulp, for example, using an extruder, can be spun and further processed into yarns or staple fibers.

One advantage of the invention is that with the use of such, in particular, insoluble disazo pigments, as well as monoazo pigments mixed therewith, no color components are present that can reduce the compatibility of the inventive adhesive tape with a line material, since the mobility of all color components is inhibited by integration into the polymer matrix. Thus according to the invention, due to the use of spinning-jet and inventively-colored yarns or fibers as substrate material of the adhesive tape, the colorant is already integrated into the polymer matrix by the manufacturing process of the fibers themselves such that later during storage or stressing of the adhesive tape at increased temperatures, discoloration of the textile pulp or colorant migration cannot occur.

All factors that disadvantageously encourage increased colorant migration, such as a necessary color excess or the use of small soluble color molecules and color accelerators in disperse dyeing, such as a possible disadvantageous effect from UV radiation on the adhesive coating applied to the substrate, such as the softening agent possibly used as solvent with soluble materials from the polymer of a conductor insulation, which is jacketed by the inventive adhesive tape, or such as the chemical composition of the conductor isolation itself, can thus be successfully counteracted by the invention.

Instead, the invention makes possible the manufacture of corresponding cable harnesses having color-stable adhesive tape and here also color-stable conductor jacketing. The electrical lines and the further components for cable sets here are divided into temperature classes in a known manner in the automobile industry for establishing their maximum continuous service temperature, which are reproduced in Table 1. Depending on the area of use in the automobile industry an inventive adhesive tape can be advantageously used if this or a cable bundle jacketed by the adhesive tape must have a resistance up to temperatures of more than 125° C., i.e., if it is to be used under the conditions of at least temperature class T3 (C), preferably of temperature class T4 (C), according to LV 312. It is understood here that the adhesive tape by itself must have at least the same color stability as a cable harness jacketed by it.

TABLE 1

Classification of temperature classes according to LV 312

| Class | Continuous service temperature in ° C. (3000 h) |
|---|---|
| T1 (A) | −40 to 85 |
| T2 (B) | −40 to 105 |
| T3 (C) | −40 to 125 |
| T4 (D) | −40 to 150 |
| T5 (E) | −40 to 175 |

For the spinning-jet coloring the colorants can also be first mixed in a suitable ratio to one another even before their addition to the textile pulp, possibly to a lower particle size than in the delivery state, in particular to smaller than 100 μm, preferably ground using a ball mill of smaller than 50 μm and then mixed in a suitable mass proportion with polymer that is not yet melted. This mixture can then be melted into a master batch and granulated, and in this way a colorant carrier is produced. In the colorant carrier the colorant is contained in higher concentration than later in the colored textile pulp.

If the colorant carrier is then added later during melting or to the molten polymer, i.e., to the textile pulp specified for yarn formation, then a more homogeneous and faster color distribution can thereby advantageously be achieved than with direct addition of the colorant.

The textile pulp can be processed both into staple fiber yarns and into filament yarns. Fabrics made from filament yarns have a greater abrasion resistance compared to fabrics from staple fiber yarns.

Since with spinning-jet coloring, in contrast to disperse dyeing, it is not the finished fabric that is colored but rather the yarns or fibers, these can also later be further processed in a suitable manner into multi-color textile substrates, e.g., interwoven using different-colored threads into a multi-colored fabric. Here the fabric can be manufactured from a single origin or as a mixed fabric, preferably based on polyolefins, polyesters, or polyamides.

With respect to the fiber strength, and thus the abrasion resistance of textile substrates made therefrom, it is advantageous with spinning-jet coloring that, since with spinning-jet coloring the coloring occurs before the manufacturing of the fiber, unlike with disperse dyeing, fiber damage cannot occur in the color bath. For example, with respect to thread fineness and thread count of nominally identical fabrics, the spinning-jet colored fabric has a higher abrasion resistance since subsequent damage to the threads by the color treatment is completely precluded.

Particularly preferably part of the fibers or all fibers can be partially or completely comprised of polyester (PES). Polyester fibers are advantageous since they have, for example, low density, high ductility and elongation at break, very good dielectric behavior, very low water absorption, and low wear. In particular, although polybutylene terephthalate (PBT) can also be used, it is possible here that some or all of the fibers are partially or completely comprised of polybutylene terephthalate (PET).

The abrasion resistance is determined according to LV 312 following DIN ISO 6722 by the adhesive tape first being adhered to a mandrel (metal rod) with a 5 mm diameter. Using a scraping tool that has a needle diameter of 0.45 mm under a weight force of 7 N the number of strokes is then determined that is required to rub through the adhesive tape. With respect to the abrasion resistance the classification reproduced in the following Table 2 is provided here in LV 312.

TABLE 2

Classification of abrasion classes according to LV 312

| Abrasion class | Requirement on 5 mm mandrel |
|---|---|
| A no abrasion protection | <100 strokes |
| B slight abrasion protection | 100-499 strokes |
| C moderate abrasion protection | 500-999 strokes |
| D high abrasion protection | 1000-4999 strokes |
| E very high abrasion protection | ≥5000-14999 strokes |
| F extremely high abrasion protection | ≥15,000 strokes |

In particular the adhesive tape can have at least an abrasion of class C according to the standard LV 312 (October/2009). This means that the adhesive tape advantageously withstands at least 700 to 800 strokes until it is rubbed through. In the example to be described below class D would even be achieved.

The good abrasion resistance of an adhesive tape is advantageous for application areas wherein the adhesive tape is subjected to a high mechanical load. For further increase of the abrasion resistance, combinations of fabrics with fleece materials can preferably be used wherein at least either the fabric or the fleece is colored according to the invention.

The inventively used disazo compound and/or the monoazo compound optionally used in the mixture in addition thereto can preferably contain at least one aromatic ring, preferably at least two condensed aromatic rings, including in particular at least one, preferably more, functional auxochromic groups. The functional auxochromic groups can in particular be one or more functional groups of the chemical formula R—OH, R—O—R', R—NH$_2$, R—NH—

R', R—NHCO—R', wherein R is a first alkyl or aryl group and R' a second alkyl or aryl group. These functional groups act as electron donors by moving electrons to the chromophoric groups —N═N—. The absorption maximum of the already available colored chromophoric N═N groups can thereby be shifted in the spectrum and an optically perceptible color change occurs. With organic colorants in particular the bathochromic groups i.e., in the sense of causing a shift of the absorption spectrum to the longer-wavelength, lower-energy region of the electromagnetic spectrum —OH, —NH$_2$, —NR$_2$, and —OCH$_3$ cause a shift of the absorption spectrum from violet through blue, cyan, green, and yellow to red. Due to this change in the absorption of the substrate the perceived color of the colored adhesive-tape substrate changes accordingly.

Inversely by using the hypsochromic effect, also referred to as blueshift, a shift of the absorption spectrum of a colorant into the shorter-wavelength, higher-energy region of the electromagnetic spectrum can be achieved as needed. For this purpose, for example, a halogenation of the colorant molecule can be effected.

It is particularly preferred if the disazo compound contains chlorinated aromatic rings, wherein in particular it is the condensation product of two chlorinated monoazo compounds.

Pigments used for coloring the textile substrate can in particular have a particle size in the range from 0.05 mm to 3.0 mm, preferably in the range from 0.2 mm to 1.7 mm.

BRIEF DESCRIPTION OF THE DRAWINGS

The invention shall be explained in more detail based on the exemplary embodiments depicted in the drawings.

In the various Figures of the drawings, identical parts are always provided with the same reference numbers, so that they are each generally described only once.

DETAILED DESCRIPTION

For the subsequent description it is emphasized that the invention is not limited to the exemplary embodiment and not to one or more features here of described feature combinations, rather each individual feature of the exemplary embodiment, even detached from all others in the context of partial features described therewith, is in itself of meaning for the object of the invention. Thus, for example, the features of the adhesive-tape properties listed in Table 3 below are not necessarily associated with each one another.

In particular the substrate of the inventive adhesive tape, which substrate contains the disazo colorant, and which can also be used without adhesive coating for jacketing of elongated objects, is attributed an independent inventive meaning.

Figure 1:
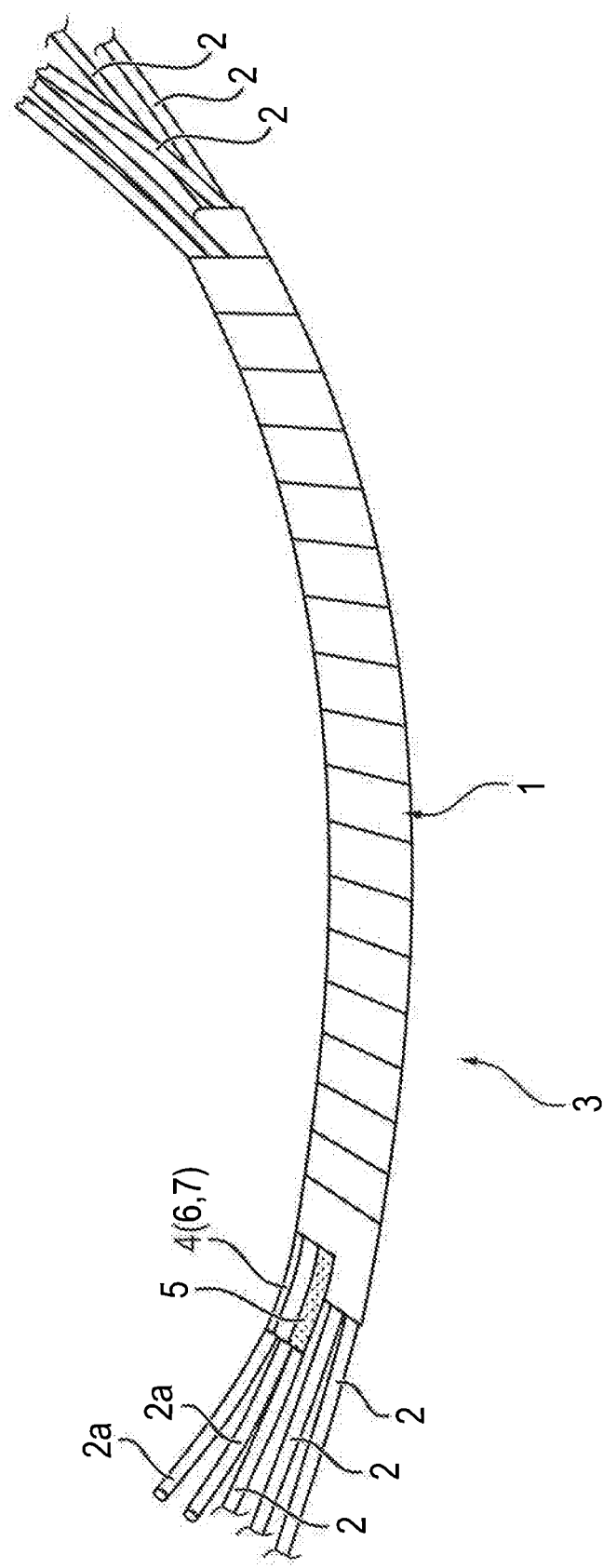
FIG. 1 shows a depiction of a cable harness jacketed with an inventive technical adhesive tape.

As FIG. 1 first of all illustrates, which shows a preferred application case of an inventive adhesive tape 1 for jacketing of cable sets, i.e., a cable-wrapping tape, an inventive adhesive tape is advantageously suitable for jacketing strands 2 of electrical lines whereby, in the depicted case by a helical wrapping, a cable harness 3 can be produced, in particular for the automobile industry.

The inventive adhesive tape 1 here comprises a band-shaped textile colored substrate 4 and an adhesive layer 5 applied to one-side on the substrate 4, preferably comprised of a pressure-sensitive adhesive. The textile substrate 4 contains yellow and red colorants, of which according to the invention at least one of the colorants, preferably the red, contains a disazo compound or is entirely comprised thereof. The textile substrate 4 is comprised here in a particularly preferred manner of spinning-jet colored yarns 6 or fibers 7. The line set comprised of strands 2 is wound by the inventive adhesive tape 1, wherein the strands 2 can have a casing comprised of polyvinyl chloride (PVC), which casing is indicated in FIG. 1 by the reference number 2a. However, a high compatibility with the lines is in particular not only provided with PVC and other halogen-containing casing materials, such as, for example, perfluoro ethylene-propylene (FEP) or ethylene tetrafluoroethylene (ETFE), but also when strands 2 are used in the cable set whose casing 2a is comprised of halogen-free plastics, such as of radiation cross-linked polyethylene (XPE) or polypropylene (PP).

Inventive Example ("EB" in Table 3)

The following pigments are exemplarily used as yellow and red colorant: The calcium salt of 4-chloro-2-[[4,5-dihydro-3-methyl-5-oxo-1-(3-sulfophenyl)-1H-pyrazol-4-yl]azo]-5-methyl-benzenesulfonic acid as yellow colorant and N,N'-(2,5-dichloro-1,4-phenylene)bis[4-[(2,5-dichlorophenyl)azo]-3-hydroxynaphthalene-2-carboxamide] as red colorant.

Figure 2:
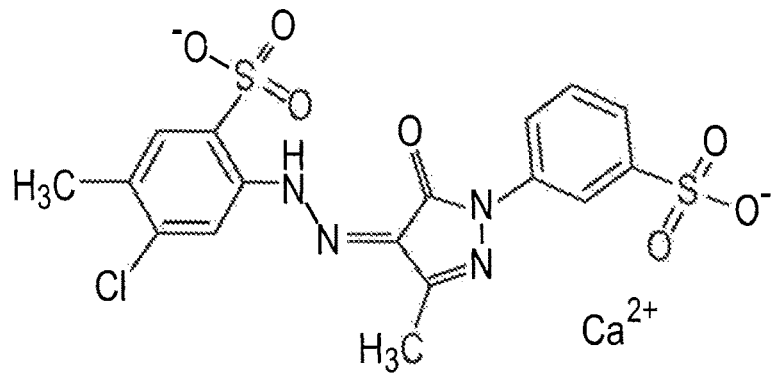
FIG. 2 shows a structural formula of a monoazo pigment usable as yellow colorant in the context of the invention.
Figure 3:
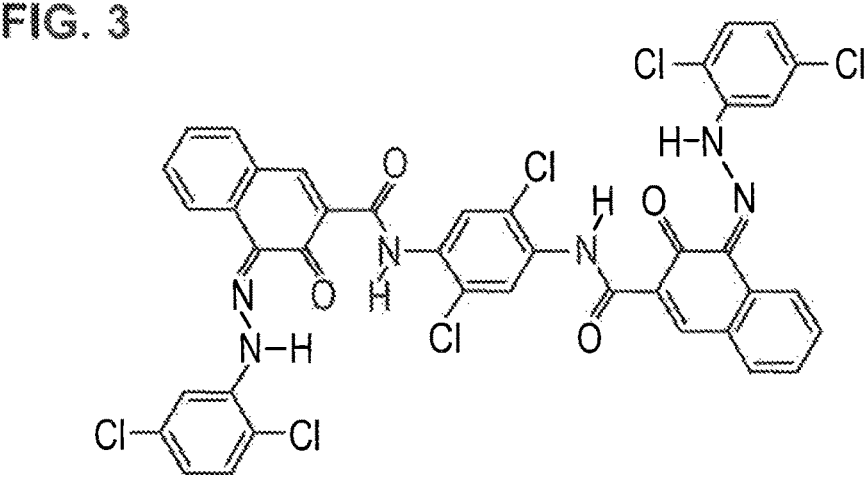
FIG. 3 shows a structural formula of an exemplary inventive disazo pigment usable in particular as red colorant that is a tautomer in equilibrium with the structure shown in FIG. 4.

The structural formulas of the two colorants are depicted in FIGS. 2 and 3. FIG. 2 here shows the yellow colorant and FIG. 3 the red colorant. The yellow colorant is a monoazo pigment, and according to the invention the red colorant is a disazo pigment. The yellow colorant is sealed by salt formation and thus practically insoluble in water. The red colorant is also insoluble due to the condensation of two monoazo compounds. It contains no sulfuric acid groups which could increase the solubility.

In considering the structural formulas in FIGS. 2 and 3 it is noticeable that these do not contain the chromophoric azo groups mentioned at the beginning. This is due to the fact that in the solid state practically all, in particular commercial, azo pigments are present in their tautomeric hydrazine form. FIGS. 2 and 3 shows this hydrazine form.

When molecules in fact have the same molecular formula, but the individual atoms are linked differently, these are called isomers. Tautomers are isomers that quickly transition into each other by the migration of individual atoms or atom groups, i.e., the two isomers are in chemical equilibrium with each other. Due to the equilibrium the individual tautomers can often not be isolated, wherein, however, the proportion of the tautomers with respect to one another is constant. Tautomers often differ in the position of a group and/or in the position of a double bond.

Figure 4:
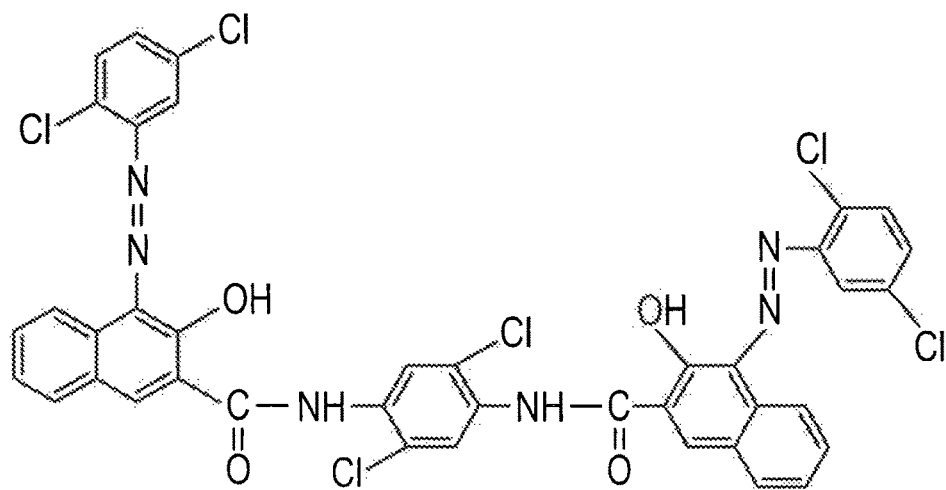
FIG. 4 shows a further structural formula of the inventive disazo pigment of FIG. 3 usable in particular as red colorant, for exemplary depiction of the tautomerism of azo and hydrazone isomers.

The equilibrium tautomer for the disazo colorant depicted in FIG. 3 can be seen in FIG. 4, wherein the formula of the azo isomer having the respective double bond between the nitrogen atoms can be seen therein, while in FIG. 3 in the formula of the corresponding hydrazine isomers the double bond is respectively located between the nitrogen atom and the adjacent carbon atom, and the hydrogen atom has migrated from the hydroxyl group bound to the carbon atom according to FIG. 4 to the nitrogen.

According to the application, generally, even if they are not explained again explicitly in each detailed case in the description and the claims, all isomeric forms of the monoazo and disazo compounds are included. This also possibly concerns the location isomerism of auxochromic groups, such as the $SO_3$ group in FIG. 2, or the Cl atoms in FIG. 3 and FIG. 4. Finally, for example, they need not necessarily, as depicted, be located in para position, but could also be bound in ortho or meta position. According to the invention, in particular with respect to double bonds and aromatic rings contained in the molecule of the colorant, various isometric molecular configurations are also comprised that are subsumed under the term cis-trans isomerism.

The pigments were mixed in a ratio of 4 (yellow) to 3 (red) and then mixed with a mass proportion of 30 mass percent with PET. The mixture was melted and granulated into a master batch. The master batch was then added in a concentration of 1.5 mass percent to the textile pulp. The mixture ratio mentioned is maintained here in the textile pulp.

In this respect it is generally to be mentioned that the colorant can be advantageously contained in the colorant carrier at a proportion of 10 mass percent to 50 mass percent, preferably of 40 mass percent to 45 mass percent, and that the colorant carrier can be added to the polymeric pulp for spinning in a concentration of 0.2 mass percent to 3.0 mass percent, preferably of 1.0 mass percent to 2.0 mass percent.

The ratio in which the yellow or blue and the red pigments are mixed with each other depends on the color to be obtained and can preferably fall in the range from 2 to 6 parts yellow/blue, to 3 parts red. The mixed colors arising with this subtractive color mixing are always darker than the output colors of the individual colorants.

The pulp for spinning thus obtained can processed into both staple fiber yarns and filament yarns. A staple fiber year is comprised of endlessly long fibers that are turned by spinning. A filament yarn is comprised of filaments, wherein a filament, according to the standard DIN 60000 (October/1990), is a fiber of unlimited length or, according to the standard DIN 60001 (October/1990), has a length of at least 1000 mm. In comparison to fabrics made from staple fiber yarns, fabrics made from filament yarns have a higher abrasion resistance.

For manufacturing the textile substrate 4 a filament yarn is manufactured by swirling of individual filaments. The number of filaments here can in particular comprise 24 to 144, preferably 34 to 38 filaments. The fiber fineness can preferably fall in a range from 2 dtex to 3 dtex. The yarn was woven into a fabric with plain weave. By combination with a suitable contact adhesive in the adhesive layer 5, in the present case with a UV-cross-linkable acrylate (in Table 3:

"UV acrylate"), a color-stable orange colored adhesive tape 1 with a high temperature resistance was produced.

The adhesive layer 5 of the adhesive tape 1 preferably comprises pressure-sensitive contact adhesive, in particular based on polyacrylate, which can be used due to its good aging resistance. These acrylate adhesives can generally either be applied as dispersion or as melt adhesive to be cross linked by UV radiation. In principle the use of solvent acrylates or, however, the use of acrylate-monomer mixtures or acrylate prepolymers is also possible. After the coating these are optionally polymerized and cross-linked, either thermally or by UV radiation. In addition the use of other contact adhesive classes such as, for example, adhesives based on synthetic rubber such as SIS (styrene-isoprene-styrene copolymer) or SBS (styrene-butadiene rubber) or adhesives based on silicone or polyurethane is also possible.

The adhesive layer can have an application weight in the range from 20 $g/m^2$ to 170 $g/m^2$, preferably an application weight in the range from 40 $g/m^2$ to 100 $g/m^2$.

Comparative Example ("VB" in Table 3)

A filament yarn colored with conventional azo pigments, however, otherwise identical to the inventively embodied filament yarn, was woven into a fabric with plain weaving, coated with a UV-cross-linkable acrylate mixture and after UV-cross-linking fabricated into an adhesive tape in exactly the same way as the inventive adhesive tape 1.

Table 3 below shows in detail the features or parameters of the inventive exemplary embodiment EB compared to the example VB according to the prior art.

The only gradual change in the inventive example EB from orange (RAL 2003) to bright red (RAL 2012) is accepted in the industry, however not an extensive discoloration as in the counterexample VB, where after the aging only a light brown-pink (Pantone 475) can still be recognized.

TABLE 3

Parameter comparison of the examples

| Feature | Standard | Unit | EB | VB |
|---|---|---|---|---|
| Substrate | — | — | PET fabric | PET fabric |
| Pigments | — | — | Azo + disazo | AZO |
| Warp thread count | — | — | 49 | 49 |
| Warp thread unit | DIN EN ISO 1973:1995 | dtex | 167 | 167 |
| Weft thread count | — | — | 27 | 27 |
| Weft thread unit | DIN EN ISO 1973:1995 | dtex | 167 | 167 |
| Adhesive | — | — | UV acrylate | UV acrylate |
| Adhesive application | — | $g/m^2$ | 90 | 90 |
| Tape thickness | EN 1942 | mm | 0.240-0.245 | 0.240-0.245 |
| Breaking force | EN 14410 | N/cm | 278-287 | 250-290 |
| Elongation at break | EN 14410 | % | 46-49 | 45-50 |
| Adhesive force, steel | DIN EN 1939 | N/cm | 7.9-9.0 | 7.6-9.5 |
| Adhesive force, tape backs | DIN EN 1939 | N/cm | 10-13 | 11-14 |
| Abrasion class | LV 312 | — | D | D |
| Color before aging | RAL | No. | 2003 | 2003 |
| | Pantone | No. | 1575 | 1575 |
| Color after aging 3000 h at 150° C. | RAL | No. | 2012 | |
| | Pantone | No. | 7416 | 475 |
| Color after aging 10 days at 175° C. | RAL | No. | similar to 2012 | |
| | Pantone | No. | "Warm Red" | 475 |

The agings mentioned in the last two lines of table 3 were performed here under the rules of LV 312. With respect to a comparison with the temperature classes achieved according to the prior art it is noteworthy here that, and in fact without the use of health-hazardous anthraquinone, according to the invention the temperature class T4, not only T3 as according to EP 2 546 317 B1 could advantageously be achieved.

With respect to a good or at least still sufficient recognizability of the color after the aging it is to be noted that in the context of the invention it can be advantageously exploited that preferably the red colorant has a higher thermal resistance than a further, in particular yellow or blue, colorant used therewith in mixture.

The invention is not limited to the depicted and described exemplary embodiments, but rather also comprises all functionally identical embodiments in the sense of the invention. Thus it was already explained that the application weight of the adhesive can vary in a wide range. The same also applies for other parameters that are adaptable in wide ranges to the respective application case—independent of the color of the inventive adhesive type 1 and the type of its coloring.

However, the following parameter ranges appear to be particularly advantageous for the widest ranges of application of an inventive adhesive tape 1:
- a thickness in the range from 0.15 mm to 1.50 mm, preferably from 0.20 mm to 0.60 mm, according to the standard EN 1942,
- an elongation at break in the range of 20% to 70%, preferably from 45% to 55%, particularly preferably from 46% to 49%, according to the standard EN 14410,
- a breaking force in the range from 80 N/cm to 350 N/cm, preferably in the range from 260 N/cm to 290 N/cm, according to the standard EN 14410,
- an adhesive force on steel in the range from 2.0 N/cm to 12.0 N/cm, preferably in the range from 5.0 N/cm to 10.0 N/cm, particularly preferably in the range from 7.5 N/cm to 9.0 N/cm, according to the standard DIN EN 1939,
- an adhesive force on a tape back in the range from 4.0 N/cm to 15.0 N/cm, preferably in the range from 10.0 N/cm to 13.0 N/cm, according to the standard DIN EN 1939,
- a noise damping of class C according to the standard LV 312 with laminating of the fabric in the substrate 4 with a fleece- or a further fabric-layer,
- an abrasion resistance at least of class C, preferably of class D, according to the standard LV 312.

Figure 5:
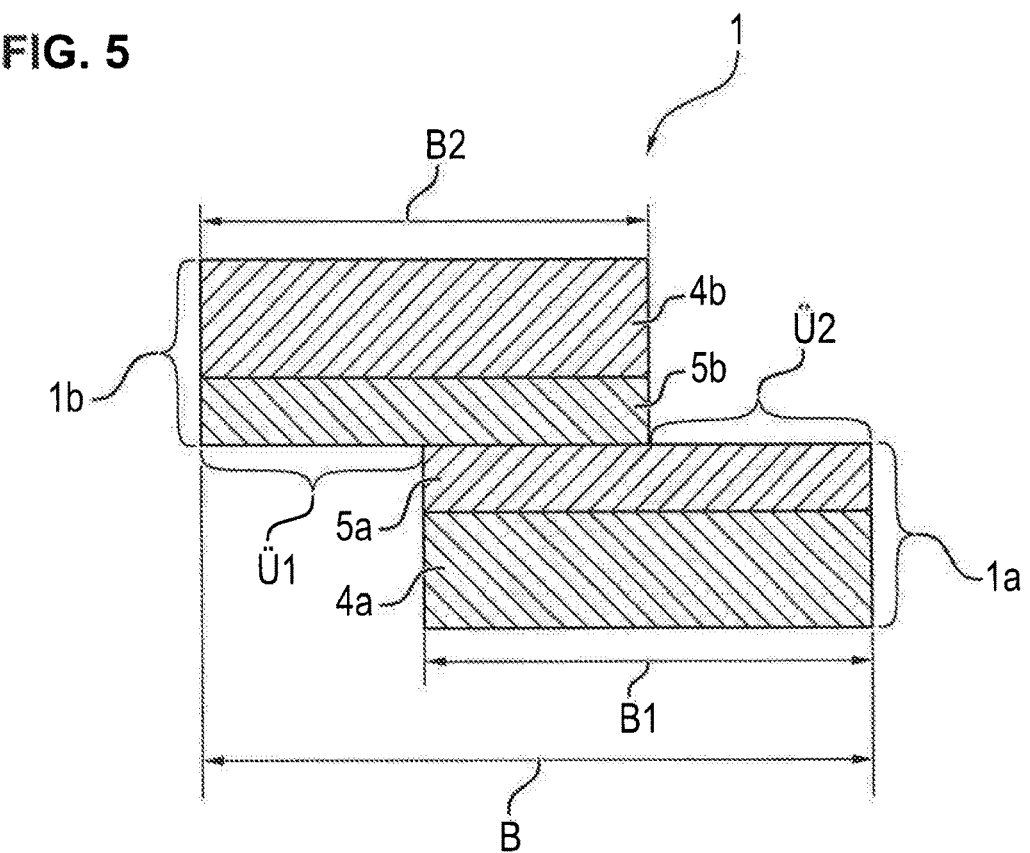
FIG. 5 shows, in cross-section, a depiction of a further embodiment of an inventive technical adhesive tape.

In the depiction shown in FIG. 5 of a further embodiment of an inventive technical adhesive tape 1 it is provided that on a first tape layer 1a second tape layer 1b is laminated-on, which second tape layer 1b in the case depicted has the same width B2 as the width B1 of the first tape layer 1a. On both sides adhesive overhangs Ü1, Ü2 are provided, wherein the adhesive overhang Ü1 on the one longitudinal side of the adhesive tape 1 is exactly as large as the overhang Ü2 on the other longitudinal side of the adhesive tape 1, however the adhesive layers 5a, 5b face in opposite directions (in FIG. 5 one upward and one downward). The total width B of the adhesive tape 1 results from the sum of the widths of the adhesive overhangs Ü1, Ü2 and the width of the overlapping region. The respective substrates 4a, 4b of the tape layers 1a, 1b can be comprised of different materials, wherein, for example, the substrate 4a of the first tape layer 1a can be comprised of a fleece and the substrate 4b of the other tape layer 1b of a fabric. At least one of the two substrate layers 4a, 4b here must be colored in the context of the invention. Due to the special construction a contact here of the adhesive surfaces to the object to be wrapped is substantially avoided.

If the object to be wrapped is, for example, a cable set comprised of a plurality of individual lines or strands 2, these individual lines can thereby move relative to one another and a lower bending stiffness of the wrapped cable set 3 is achieved.

Figure 6:
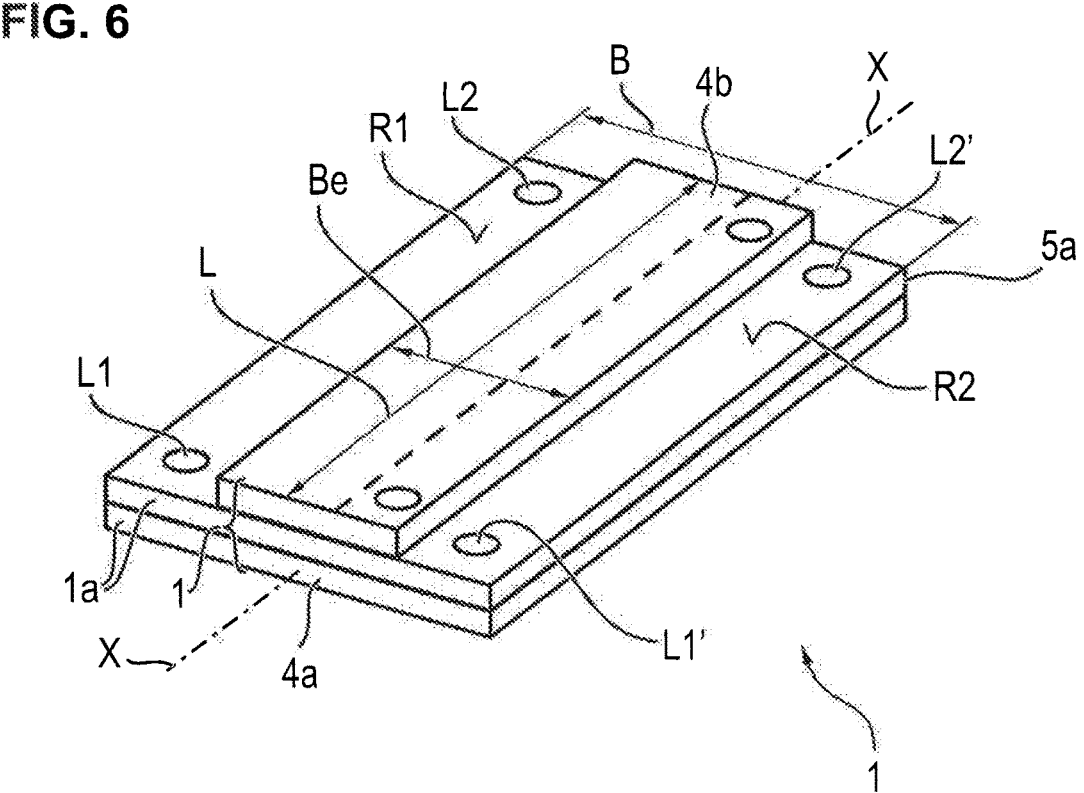
FIG. 6 shows a perspective depiction of a third embodiment of an inventive technical adhesive tape.
Figure 7:
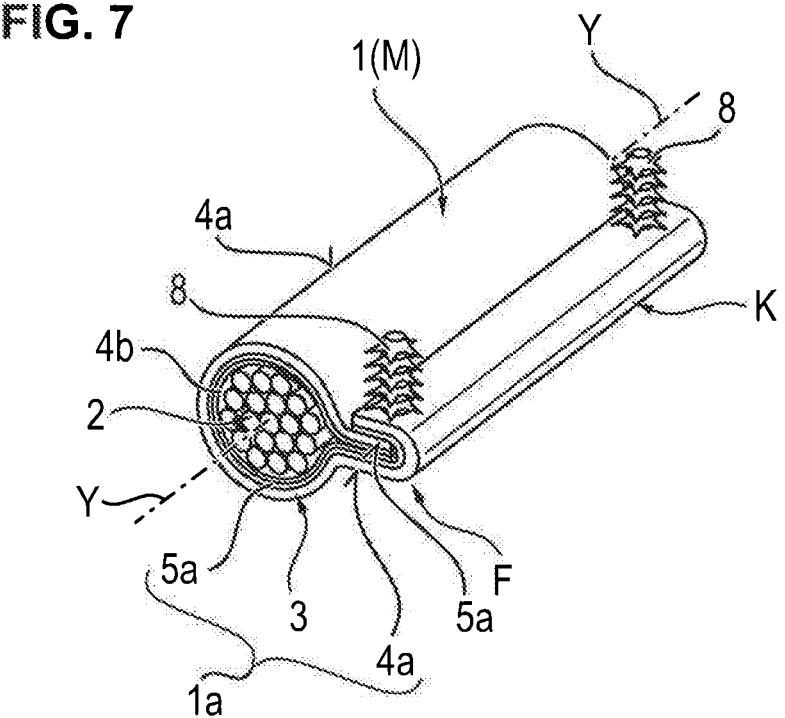
FIG. 7 shows a perspective depiction of a cable harness jacketed with the third embodiment of an inventive technical adhesive tape.

The two further embodiments of the invention shown in FIGS. 6 to 9 are respectively wrapping means for an elongated object, which, however, according to the application is also subsumed under the term "adhesive tape 1," even if it only has a comparatively small length L. The embodiments depicted can be, for example, sections of a longer tape. In particular in turn in FIGS. 7 and 9 an electrical cable set including strands 2 is depicted as elongated object. The adhesive tape 1 with the width B here is formed by a second substrate layer 4b being laminated-on onto a first tape layer 1a that comprises a first substrate layer 4a with an adhesive layer 5a. The second substrate layer 4b forms a central non-adhesive region of the adhesive tape 1 over a width Be, which central non-adhesive region serves, in particular exclusively, for abutment of the to-be-wrapped object, e.g., strands 2, and is respectively delimited on both sides by an edge region R1, R2. If this is comprised of fleece, for example, in this manner a high noise damping and a high abrasion resistance of the inventive adhesive tape 1 can simultaneously be achieved. In the installed state the two edge regions R1, R2 can, as FIG. 7 shows, respectively together form an attachment flag F lying laterally near the centrally disposed second substrate layer 4b. In each edge region R1, R2 there is at least one hole, in the depicted case two holes L1, L2, L1', L2'. Here a hole L1, L2 in the one edge region R1 is respectively axially symmetrically associated with a hole L1', L2' in the other edge region such that the holes L1, L2, L1', L2' can be brought together for covering by a folding of the adhesive tape 1 along a main axis X-X (FIG. 6) extending through the centrally disposed second substrate layer 4b or by a bending about an axis Y-Y spaced from the adhesive tape 1 (FIG. 7) extending parallel to this main axis X-X, as shown in FIG. 7. The axis Y-Y spaced from the adhesive tape 1 here is identical to the longitudinal axis of the elongated object or strands 2. In terms of manufacturing technology the holes L1, L2, L1', L2' can more simply and therefore preferably be stamped holes. Due to the prefabricated holes L1, L2, L1', L2', through which, as shown in FIG. 7 but then also in FIG. 9, attachment means 8, such as attachment clips or another fastener, can be plugged, with the inventive adhesive tape 1 a cuff M, also called a sleeve, can be provided for the elongated object, which due to a special design already contains the possibility of a simple attachment to the attachment means 8 on another component, e.g., on a vehicle chassis. The necessity of a later attachment of attachment means 8 on the longitudinal wrapping M by additional adhesive tapes or the like is thereby omitted. The size and shape of the holes L1, L2, L1', L2' can preferably be matched to the size and shape of the attachment means 8 such that the attachment means 8 is held in the holes L1, L2, L1', L2' by interference and friction-fit. Here also the respective substrates 4a, 4b of the adhesive tapes 1a, 1b can be comprised of different materials, wherein, for example, the substrate 4b can be comprised of a fleece and the substrate 4a of the first (single) adhesive tape 1a of a fabric in order to combine a high noise damping and a high abrasion resistance with each other. In this embodiment at least the outer-lying first substrate layer 4a in the installed state should be colored in the context of the invention.

Figure 8:
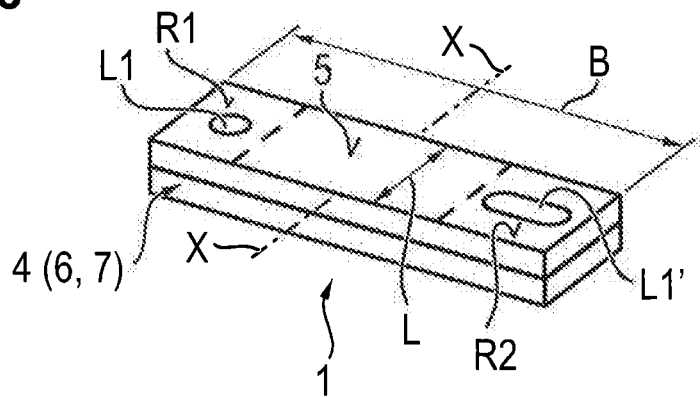
FIG. 8 shows a perspective depiction of a fourth embodiment of an inventive technical adhesive tape.
Figure 9:
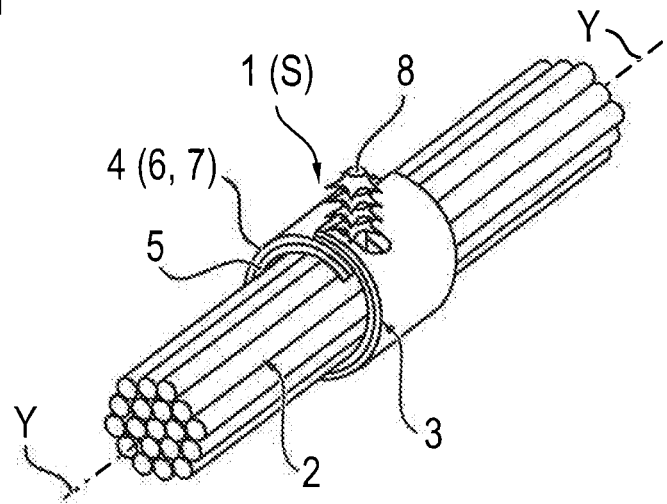
FIG. 9 shows a perspective depiction of a cable harness jacketed with the fourth embodiment of an inventive technical adhesive tape.

In the embodiment depicted in FIGS. 8 and 9, in contrast to the embodiment in FIGS. 6 and 7, a length L of the wrapping means, which length L extends in the direction of the main axis X-X, is not larger than a width B of the wrapping means, which width B extends transverse to the direction of the main axis X-X, whereby the wrapping means can form an attachment clip S for the elongated object. This is expressed in FIG. 9, which exemplarily shows an installed state of the corresponding embodiment, by a reference number S placed in brackets behind the reference number 1 in the drawing. Furthermore it is characteristic for this embodiment that only one hole L1, L1' lies in each edge region R1, R2. The embodiment is equipped with adhesive over its entire surface by the adhesive layer 5. However, the adhesive layer 5 could also be omitted and only the substrate 4 used. A feature of this embodiment also consists in that one of the holes L1' is configured as a slot. Due to the slot it is advantageously possible to design the field of use of the inventive wrapping means to be universal by being usable for different diameters of the to-be-wrapped object.

It is expressly noted that the exemplary embodiments are not limited to all features in combination, rather each individual feature can also have an inventive meaning in itself separate from all other partial features.

Thus a similar depiction of an adhesive tape 1 as in FIG. 5 is also found in the description of EP 1 315 781 B1, wherein in this context it is mentioned that the other different adhesive tape embodiments described there can also be inventively designed.

For example, in the embodiment according to FIG. 6, in particular if the second substrate layer 4b is comprised of a fleece, a further adhesive layer can be applied to the second substrate layer 4b.

Figure 10:
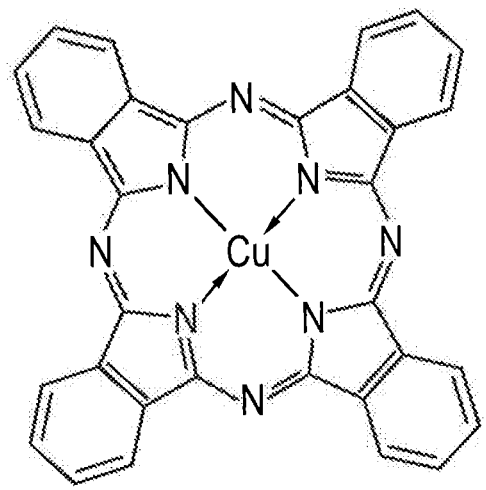
FIG. 10 shows a structural formula of a pigment usable in the context of the invention as blue colorant.
Figure 11:
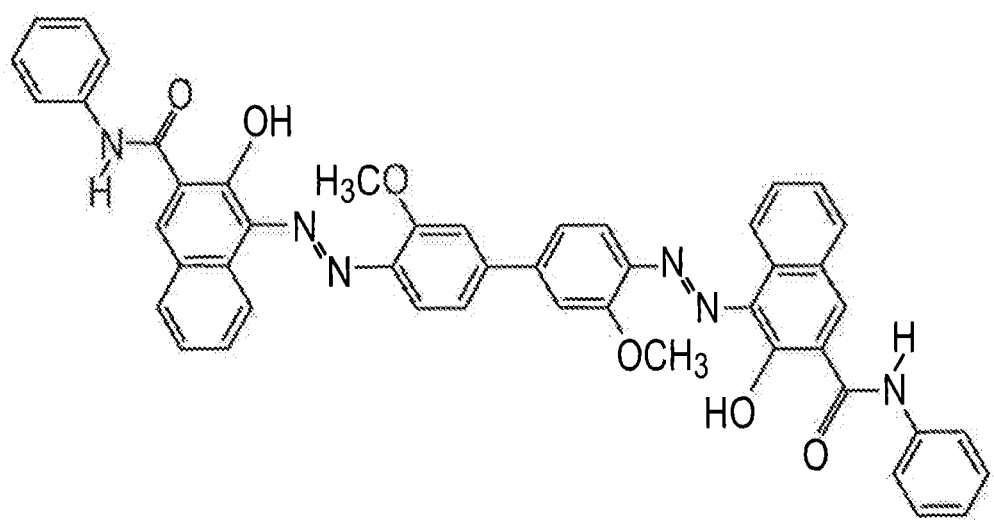
FIG. 11 shows a structural formula of a further pigment usable as blue colorant in the context of the invention.

In FIGS. 10 and 11 structural formulas of pigments usable in the context of invention as blue colorants are depicted. These can also, as described above, be used in polymer master batches for manufacturing fibers 7 for the substrate 4.

The colorant depicted in FIG. 10 is a blue phthalocyanine colorant, in particular copper phthalocyanine.

Copper phthalocyanine is a chemically complex compound between copper and phthalocyanine, wherein the copper forms the central atom and has long been used as a stable and water-insoluble colorant for other applications, for example in Germany for the manufacture of blue paper waste bins. It has a melting point of more than 150° C.

The colorant depicted in FIG. 11 is a blue disazo colorant, in particular 4,4'-[(3,3'-dimethoxy[1,1'-biphenyl]-4,4'-diyl) bis(azo)]bis[3-hydroxy-N-phenylnaphthalene-2-carboxamide]. This is also water-insoluble and thermally stable.

Furthermore the invention is also thus far not limited to the feature combinations in claim 1 and in the other independent claims, but can also be defined by any other desired combination of specific features of all individual features disclosed overall. This means that in principle practically any individual feature of claim 1 and of the other independent claims can be omitted or replaced by at least one individual feature disposed at another point in the application.

While the above description constitutes the preferred embodiment of the present invention, it will be appreciated that the invention is susceptible to modification, variation and change without departing from the proper scope and fair meaning of the accompanying claims.

The invention claimed is:

1. Adhesive tape, in the form of an orange-colored adhesive tape, adapted as a cable-wrapping tape, comprising a colored textile substrate and an adhesive layer applied to at least one side of the substrate, wherein the substrate contains at least one of a red colorant and a further colorant, and further wherein at least one of the colorants contains or is formed entirely of a disazo compound.

2. The adhesive tape according to claim 1, further comprising in that the disazo compound is a red or blue colorant.

3. The adhesive tape according to claim 1 further comprising in that the disazo compound is a condensation product of two chlorinated azo compounds.

4. The adhesive tape according to claim 1 further comprising in that at least one other of the colorants contains a monoazo compound, a further disazo compound, or a phthalocyanine compound.

5. The adhesive tape according to claim 4 further comprising in that the further disazo compound, the monoazo compound, or the phthalocyanine compound is a pigment insoluble in water.

6. The adhesive tape according to claim 4 further comprising in that the disazo compound or the monoazo compound contains at least one aromatic ring that includes at least one or more functional auxochromic groups.

7. The adhesive tape according to claim 6, further comprising in that the functional auxochromic groups comprise one or more functional groups of the chemical formula R—OH, or R—O—R', or R—NH$_2$, or R—NH—R', or R—NHCO—R' wherein R is a first alkyl or aryl group and R' is a second alkyl or aryl group.

8. The adhesive tape according to claim 1 further comprising in that the further colorant is yellow or blue.

9. The adhesive tape according to claim 8 further comprising in that the yellow colorant is a salt of 4-chloro-2-((4,5-dihydro-3-methyl-5-oxo-1-(3-sulfophenyl)-1H-pyrazol-4-yl(azo)-5-methyl-benzenesulfonic acid.

10. The adhesive tape according to claim 1 further comprising in that the red colorant has a higher thermal resistance than the further colorant used in a mixture therewith.

11. The adhesive tape according to claim 1 further comprising in that the red colorant is N,N'-(2,5-dichloro-1,4-phenylene)bis(4-((2,5-dichlorophenyl)azo)-3-hydroxynaphthalene-2-carboxamide).

12. The adhesive tape according to claim 1, wherein the substrate comprises a fabric or a fleece, which is comprised of polyester, polypropylene, or polyamide yarns or fibers, further wherein at least a portion of the yarns or fibers are completely or partially comprised of polyester (PES).

13. The adhesive tape according to claim 1, wherein the substrate comprises spinning-jet colored yarns or fibers, or is entirely comprised of spinning-jet colored yarns or fibers.

14. The adhesive tape according to claim 1, wherein the adhesive layer comprises a pressure-sensitive self-adhering adhesive in the form of an acrylate adhesive, a silicone adhesive, or an adhesive based on rubber.

15. The adhesive tape according to claim 1 further comprising in that the adhesive layer has an application weight in the range of 20 g/m$^2$ to 170 g/m$^2$.

16. The adhesive tape according to claim 1 further comprising in that the adhesive tape has a thickness in the range of 0.15 mm to 1.50 mm, according to the standard EN 1942.

17. The adhesive tape according to claim 1 further comprising in that the adhesive tape has an elongation at break in the range of 20% to 70%, according to the standard EN 14410.

18. The adhesive tape according claim 1 further comprising in that the adhesive tape has a breaking force in the range of 80 N/cm to 350 N/cm, according to the standard EN 14410.

19. The adhesive tape according to claim 1 further comprising in that the adhesive tape has an adhesive force on steel in the range of 2.0 N/cm to 12.0 N/cm, according to the standard DIN EN 1939.

20. The adhesive tape according to claim 1 further comprising in that the adhesive tape has an adhesive force on a tape back in the range of 4.0 N/cm to 15.0 N/cm, according to the standard DIN EN 1939.

21. The adhesive tape according to claim 1 further comprising in that the adhesive tape has a noise damping of class C according to the standard LV 312.

22. The adhesive tape according to claim 1 further comprising in that the adhesive tape has an abrasion resistance of at least class C, according to the standard LV 312.

23. The adhesive tape according to claim 1 further comprising in that the substrate exhibits a color according to RAL corresponding to at least one of the number codes: 2000 yellow-orange, 2001 red-orange, 2002 blood-orange, 2003 pastel orange, 2004 pure orange, 2005 light orange, 2007 light-bright orange, 2008 bright-red orange, 2009 traffic orange, 2010 signal orange, 2011 deep orange, 2012 salmon orange, and 2013 pearl orange.

24. The adhesive tape according to claim 1, wherein the colored textile substrate and the adhesive layer represent a first tape layer, the adhesive tape further comprising a second tape layer connected to and overlapping the first tape layer, the second tape layer having a substrate and adhesive layer that is the same as or different from the substrate and adhesive layer of the first tape layer.

25. The adhesive tape according to claim 1, wherein the disazo compound, is a pigment insoluble in water.

26. The adhesive tape according to claim 1, wherein the disazo compound contains at least one aromatic ring with at least one or more functional auxochromic groups.

27. The adhesive tape according to claim 26, wherein the diazo compound contains at least two condensed aromatic rings.

28. A substrate used in an adhesive tape according to claim 1 that wraps an elongated object, the substrate comprising at least one red and at least one further colorant, wherein at least one of the colorants contains a disazo compound or is completely comprised thereof.

29. The substrate according to claim 28, further comprising in that at least one of the colorants contains a monoazo compound, a further disazo compound, or a phthalocyanine compound.

30. A cable harness, comprising an adhesive tape according to claim 1 and a line set comprised of a plurality of strands, which is wound by the adhesive tape, wherein the strands include a casing made from a halogen-containing plastic or of a halogen-free plastic or a radiation crosslinked polyethylene (XPE) or polypropylene (PP).

31. The cable harness according to claim 30, further comprising a temperature resistance at least of class T3, according to LV 312.

32. The cable harness according to claim 30 further comprising in that the adhesive tape or the substrate forms a cuff (M) or a clip (S) with an adhesive-free interior, around the line set.

33. A method for manufacturing an adhesive tape comprising a method step for manufacturing a colored textile substrate, wherein the substrate contains at least one red and optionally at least one further colorant, and applying an adhesive layer to at least one side of the substrate, wherein for manufacturing the colored textile substrate a disazo compound is used as an at least one colorant, wherein a monoazo compound, a further disazo compound, or a phthalocyanine compound is used as the at least one further colorant when the further colorant is present.

34. The method according to claim 33, further comprising in that a colorant is introduced by a spinning-jet coloring in yarns or fibers from which the textile substrate is produced.

35. The method according to claim 34 further comprising in that prior to the spinning-jet coloring colorants are mixed with each other and with a plastic from which the textile substrate is to be produced, the mixture is melted and granulated into a master batch, which serves as a colorant carrier for the subsequent spinning-jet coloring by being added to a molten polymer spinning pulp, from which the fibers or yarns of the textile substrate are spun.

36. The method according to claim 35, further comprising in that a colorant is contained in the colorant carrier at a proportion of 10 mass percent to 50 mass percent.

37. The method according to claim 35 further comprising in that the mixture of the colorants and the plastic are added to the polymer spinning pulp in a concentration of 0.2 mass percent to 3.0 mass percent.

38. The method according to claim 33, further comprising in that the further disazo compound, the monoazo compound, or the phthalocyanine compound is present as a pigment, which has a particle size in the range of 0.05 mm to 3.0 mm, and is ground prior to a spinning-jet coloring to a particle size of less than 100 μm, using a ball mill.

* * * * *